Aug. 24, 1954

T. J. CRAWFORD 2,687,464

HIGH-FREQUENCY INDUCTION TUBE WELDING

Filed Jan. 11, 1951

INVENTOR.
THOMAS J. CRAWFORD.
BY
Oberlin & Limbach.
ATTORNEYS.

Aug. 24, 1954     T. J. CRAWFORD     2,687,464
HIGH-FREQUENCY INDUCTION TUBE WELDING
Filed Jan. 11, 1951     4 Sheets-Sheet 3

INVENTOR.
THOMAS J. CRAWFORD.
BY Oberlin E Limbach
ATTORNEYS.

Aug. 24, 1954

T. J. CRAWFORD

2,687,464

HIGH-FREQUENCY INDUCTION TUBE WELDING

Filed Jan. 11, 1951

INVENTOR.
THOMAS J. CRAWFORD.

ATTORNEYS.

Patented Aug. 24, 1954

2,687,464

UNITED STATES PATENT OFFICE 2,687,464

HIGH-FREQUENCY INDUCTION TUBE WELDING

Thomas J. Crawford, Berkley, Mich.

Application January 11, 1951, Serial No. 205,511

19 Claims. (Cl. 219—6)

This invention relates as indicated to a novel high frequency induction tube welder and more particularly to a welder adapted to produce continuous lengths of tubing, and to an improved method of welding.

Many attempts have been made to produce metal tubing by forming flat strips to the desired tubular form and then welding the resultant opposed seam edges together by application of electrical energy thereto. The well-known Yoder electric resistance-weld tube mills which are now extensively employed utilize a pair of rotary electrodes positioned above the formed tube blank and engaging such blank to either side of the seam. The resistance to passage of the electric current across such seam serves to melt the abutting edges for an instant, rendering the pressure of closely adjacent squeeze rolls effective to press and forge such edges together to unite the same by complete fusion into one homogeneous mass of metal which actually is found to be stronger than the unwelded portion of the tube wall. While this method of welding has met with great commercial success, there are nevertheless factors which definitely limit practicable welding speeds, and therefore the rate of production of the finished tubing, inasmuch as it is, of course, possible to preform the flat metal strip into the tubular blank at a very high speed indeed. Careful adjustment and supervision of the welder is required and the rotary electrodes must be trimmed or replaced when worn or when a slightly different size tubing is to be produced. Certain metals such as aluminum, stainless steel and silicon bronze are, moreover, very difficult to weld in this manner. Very thin walled tubing has always been extremely difficult to weld due to inability to withstand the heavy external pressures necessarily imposed thereon, a wall about .028 inch in thickness being the thinnest successfully welded by resistance methods.

Attention has been given to the possibility of heating the opposed seam edges to welding temperature by means of a current induced in the tube blank itself as taught, for example, in Adams Patents Nos. 2,181,445 and 2,335,894, a relatively high voltage, low frequency current being induced to cause arcing between the spaced seam edges to raise the same to welding temperature prior to passage between appropriate squeeze rolls. It has also been suggested to utilize a high frequency induced current, as in Leonard patent 2,205,424, with such current being localized and concentrated at a point within the confines of an induction coil encircling the tube blank and with the seam edges being forced together into welding engagement at such point. Due to operational difficulties, neither of these last-mentioned methods has ever enjoyed substantial commercial use.

It is accordingly a principal object of my invention to provide an induction tube welder and method of welding adapted to the continuous production of metal tubing at a high rate of speed.

A further object is to provide such apparatus and method which will be efficient in the production of tubing of metals and alloys which it has previously been found very difficult or impossible to weld in a satisfactory manner to produce continuous lengths of tubing.

Another object is to provide welding apparatus which will accommodate a variety of sizes of tube blanks, changes in the metals to be welded, and changes in the rate of production, with a minimum of adjustment and supervision.

Still another object is to provide apparatus and a method for welding tubular blanks which will be efficient in the consumption of electrical energy and will not overheat the body of the blank.

Still another object is to provide means for welding aluminum, copper, brass and other non-ferrous tubing as well as steel tubing and the like.

Still another object is to provide means for welding very thin-walled tubing which may, for example, have a wall thickness of about .012 inch in the case of a one inch O. D. tube.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figures 1, 6, 7:
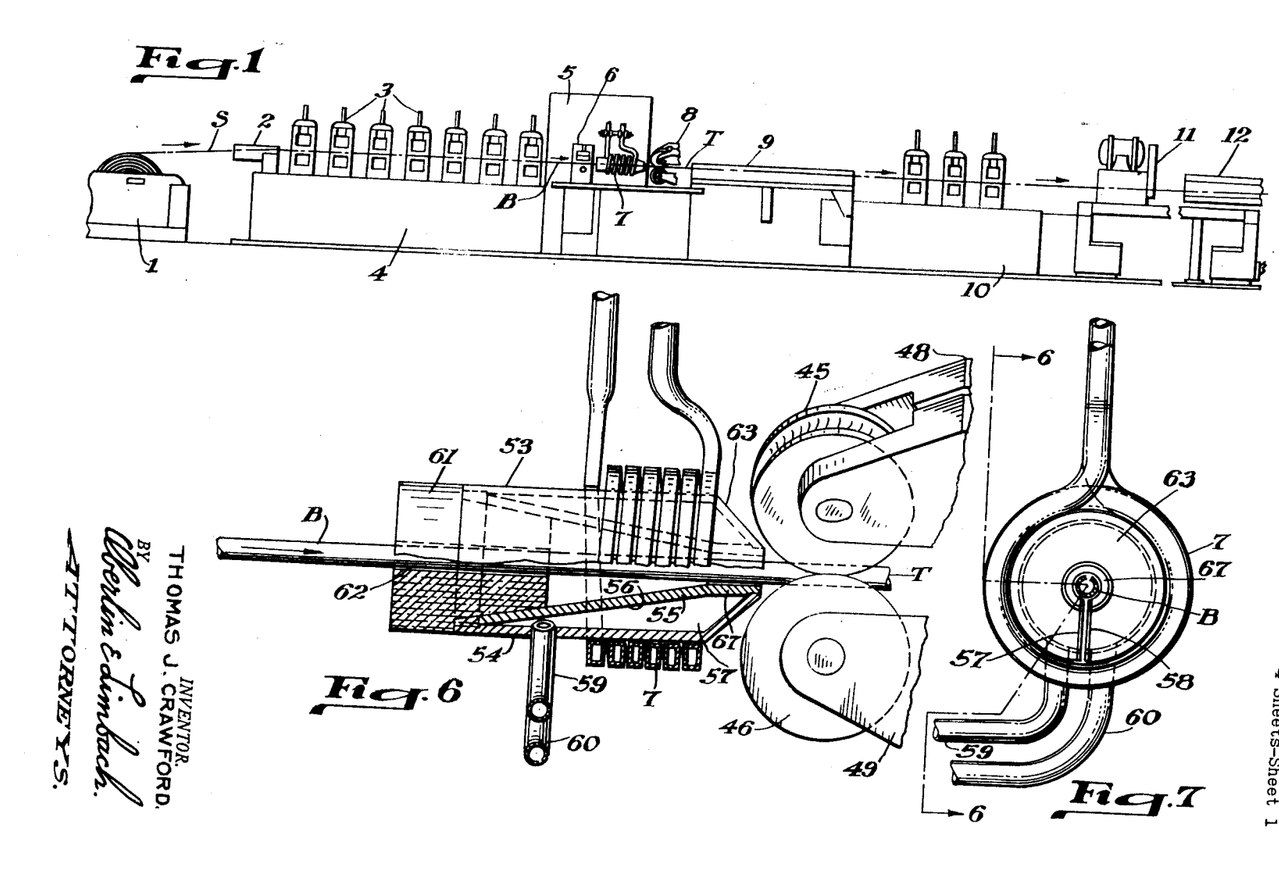
Fig. 1 is a diagrammatic elevational view of a tube mill adapted to be utilized in accordance with my invention, most of the units comprising the same being of standard type and commercially available in the Yoder mill above mentioned.
Fig. 6 is a side elevational view of one preferred form of induction coil partly broken away better to show the internal arrangement of the same.
Fig. 7 is an end elevational view of such coil.

Referring now more particularly to Fig. 1 of the drawing, the flat metal strip S is withdrawn from the coil box or uncoiler 1 and passes through an edge scarfing device 2 to the power driven roll stands 3 of the forming mill 4, such rolls being operative to advance such strip while progressively forming the same to desired tubular cross-section. The tube blank thus preformed now advances to the welder 5 which comprises a seam guide unit 6, a high frequency induction coil 7, and a squeeze roll unit 8. The welded tube next passes through the water cooling section 9, sizing and straightening unit 10, and thence to flying cut-off 11 and run-out table 12 where the lengths of finished tubing are collected and bundled. An external bead or flash trimmer (not shown) may also be located intermediate the squeeze roll unit and the cooling section. All of the units above referred to and which together comprise the complete mill are of well-known construction and commercially available with the exception of the welder 5 comprising such seam guide 6, induction means 7, and the squeeze rolls 8.

Figure 2:
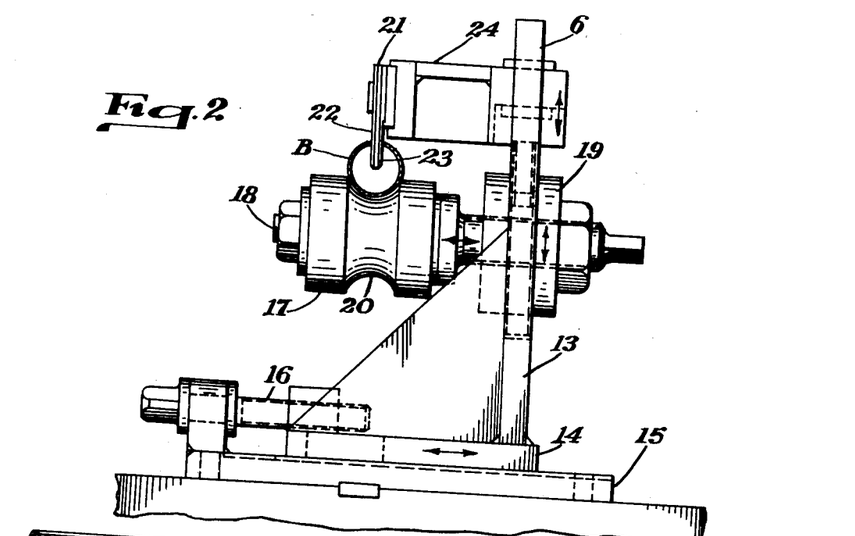
Fig. 2 is an end elevational view of a preferred form of seam guide comprising an element of my new welder.

The seam guide comprises a stand 13 carried by a slide 14 mounted on ways 15 for adjustment transversely of the path of travel of the tube blank B, such adjustment being necessary to over-correct the circumferential position of the seam if the latter has rotated out of proper alignment. An adjusting screw 16 is provided to position such slide on the ways. A roll 17 is carried by a spindle 18 supported in bearing 19 in stand 13 and is provided with a circumferential groove 20 adapted to conform to the contour of the tube blank to be welded and to support the latter. The seam guide proper comprises two flat metal blades or fins 22 and 23 separated by a layer of insulating material 21 and preferably both supported in an insulated mounting by an outrigger or bracket 24 mounted on stand 13 for vertical adjustment above roll 17. By insulating the wear resisting blades 22 and 23 from each other, and also preferably from their mounting, the passage of current across the seam at this point is prevented, it being appreciated that such seam guide will ordinarily be located quite close to the induction unit. The effect of such guide is to position and space apart the opposed seam edges 25 and 26 of the tube blank B immediately prior to passage of such blank through the induction coil, thereby properly positioning such seam for conjoint action of the squeeze rolls and also, in cooperation with such rolls, determining the angle of approach of the opposed seam edges at the point of welding. Except for the special blades comprising the seam guide proper, the entire unit is of conventional construction. It may be dispensed with entirely under certain circumstances where the tube forming mechanism is properly arranged and adjusted to form a tubular blank with the seam properly positioned and the opposed seam edges properly spaced. The exact position of the seam is of more importance when adjacent squeeze rolls are arranged to engage the tubing closely to each side of the welded seam than when a ceramic squeeze roll, for example, is mounted directly to overlie such seam. When the seam guide is utilized, it will be of slightly greater thickness than the width of the seam coming from the forming mill so as to be effective to spread such seam somewhat. The sides of the seam guide may also desirably be slightly tapered toward the point of welding, the seam edges usually approaching each other at a fairly uniform angle.

Figure 3:
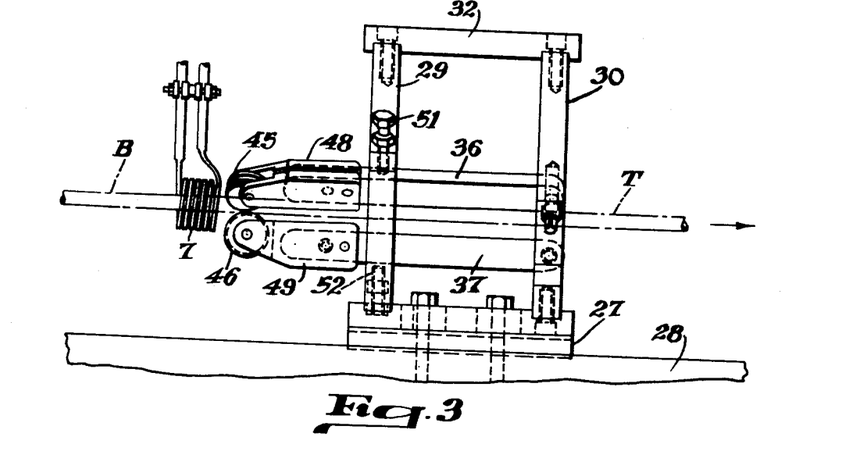
Fig. 3 is a side elevational view of the induction coil and associated squeeze roll unit which I prefer to employ in conjunction therewith.
Figure 4:
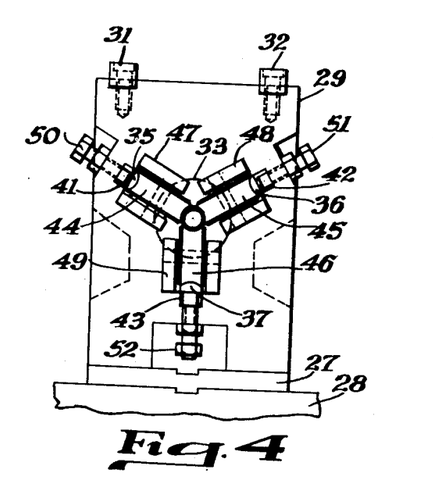
Fig. 4 is an end elevational view of such squeeze roll unit.
Figure 5:
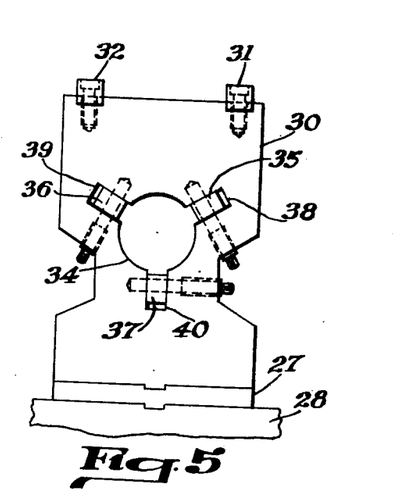
Fig. 5 is an elevational view of the other end of such squeeze roll unit.

The squeeze roll unit which is located immediately subsequent to the induction coil 7 comprises a slide 27 mounted in ways 28 for adjustment toward and away from coil 7 along the path of travel of the work (see Figs. 3–5 inclusive). Carried by such slide are two parallel upstanding plates 29 and 30 braced at their upper ends by bars 31 and 32 interconnecting the same. Such plates are provided with aligned, generally circular central apertures 33 and 34 through which the welded tube T is adapted to pass. Three arms 35, 36 and 37 are pivotally mounted in equidistant radial slots 38, 39 and 40 extending outwardly from the periphery of aperture 34 in plate or stand 30. In the embodiment illustrated, one of such slots extends vertically downwardly from such aperture.

Such arms extend toward coil 7 generally parallel to the path of travel of the tube and pass through corresponding radial slots 41, 42 and 43 in the periphery of aperture 33. Circumferentially grooved squeeze rolls 44, 45 and 46, preferably of non-magnetic material such as bronze, are carried in removable mounts 47, 48 and 49 on the ends of such respective bars adapted to engage and bear against substantially the entire periphery of the tube being welded. The precise transverse contour of the grooves in such rolls will, of course, depend upon the size and shape of the tube being welded.

Screws 50, 51 and 52 are mounted in such plate or stand 29 adapted adjustably to bear against the corresponding bars or arms 35, 36 and 37 to force the squeeze rolls carried thereby radially inwardly against the work. It will be noted that in the arrangement illustrated the welded seam, being uppermost, is adapted to pass between the slightly spaced squeeze rolls 44 and 45, and any external bead may thereafter be trimmed away by an appropriate cutting tool in well-known manner. When, however, the formation of an internal bead is not objectionable in view of the use to which the tubing is intended to be put, the roll carrying stand may be inverted so that the vertically disposed roll 46 will now be uppermost and will bear against the tubing in the region of the seam, forcing inwardly any bead which may be formed and obviating any subsequent trimming operation. In this event, such seam-engaging roll will desirably be ceramic so that flash will not tend to adhere thereto and no current will pass therethrough. The number of rolls employed may also be varied, 2 rolls, and 4 rolls, for example, being suitable under some circumstances.

The induction coil 7 will preferably be formed of electrolytic copper tubing in order that a cooling medium such as water may be circulated therethrough. When very high frequencies are to be utilized, it will be advantageous heavily to silver plate the outer surface of the coil. As best shown in Fig. 6, the turns of such coil may be of rectangular cross-section for maximum efficiency, and where very small sizes of tubing are to be welded I prefer to utilize an additional internal inductor element 53 rather than to provide a coil of extremely small diameter. As best shown in Fig. 6, such element may comprise a generally cylindrical copper shell 54 fitting closely within coil 7 but insulated therefrom. Such insulation may conveniently be in the form of tape wound upon such shell. Alternatively, a slight air gap may be provided between the shell and coil, particularly when the same are independently supported. At the end toward the squeeze roll unit, such outer wall tapers inwardly in general frusto-conical conformation. An inner conical tapering wall 55 is brazed or silver-soldered thereto forming a closed, generally annular chamber 56. Such chamber is, however, divided along a lower median line by spaced partitions 57 and 58, which may be brazed in place, leaving a narrow longitudinally extending radial gap therebetween, inner and outer walls 54 and 55 likewise being here interrupted, so that the cooling medium such as water introduced through one of conduits 59 and 60 will be caused to circulate through such chamber and escape through the other such conduit. The wall members 54 and 55 thus form a single turn coil or concentrator within the inductor coil 7. A Micarta or like insulating material plug 61 is fitted in the wider flaring end of such concentrator and provided with a central aperture 62 therethrough for passage of the preformed tube blank B closely following seam guide unit 6. Such Micarta plug serves itself as a guide for the tube blank and maintains the latter out of contact with the concentrator. This plug, and thereby the concentrator, may be supported by a suitable bracket either independently of the coil or supplementing the support afforded by such coil and interposed insulating tape. The frusto-conical portion 63 of concentrator 53 facilitates generation of a high frequency induced current in the tube blank in a region closely adjacent the following squeeze rolls.

Figure 9:
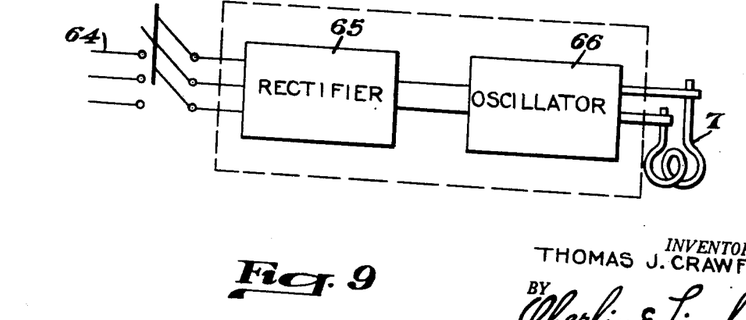
Fig. 9 is a diagrammatic representation of the means for supplying the high frequency current to the induction coil, the units comprising such means being themselves commercially available.

Inductor coil 7 is energized by power from line 64 which is first rectified by conventional rectifier 65 and the desired high frequency generated by a conventional generator such as oscillator 66. The coil leads may be clamped in the ends of appropriate bus bars, with conventional water cooling means provided for both such bars and coil. Various types of high frequency generators are commercially available such as the Westinghouse, G. E. and Reliance Electric rotating generators, the Ajax Electrothermic or Corrugated Quench Gap Co. spark gap type generator, the oscillating arc type generator and the Allis-Chalmers, Westinghouse and G. E. vacuum tube oscillators. I have found the Allis-Chalmers vacuum tube oscillator sold under the trade name "Electronic Heater" particularly satisfactory for my purpose, and for operations where welding from ½ inch to 2 inch O. D. tubing having a wall thickness of as much as 1/16 inch such oscillator having a rated output of 20 kilowatts at 400 kilocycles is suitable. An oscillator having an output of as much as 50 or 100, or even more, kilowatts may in some cases be employed. The rectifier may be air-cooled and the oscillator water-cooled, and they are commercially available with such cooling systems. The commercially available Allis-Chalmers rectifier may desirably be slightly modified by providing the same with an output filter to minimize the "ripple" component in the output voltage and thereby correspondingly minimize the modulation of the high frequency current so that periodic fluctuation of the welding heat which may otherwise be apparent when welding at high speeds (60 feet per minute, or greater) is substantially eliminated. Such rectifier may also be modified by substitution of Thyratron tubes (ionic conduction tubes with grid control) for some of the two-element mercury vapor tubes usually provided, thereby facilitating adjustment of the welding heat. Alternatively, a saturable reactor may be included in the power lead to the rectifier for the same purpose. It may additionally be desirable to incorporate means for compensating for fluctuations in the line voltage.

This Allis-Chalmers "Electronic Heater" vacuum tube oscillator has the further advantage for my purpose of incorporating provision for inductive coupling of substantially all of the oscillating tank circuit inductance into the output or work coil circuit; the low power factor of the work coil or inductor together with its load makes this type of couple highly desirable to obtain efficiency of operation when the work is of non-ferrous or non-magnetic material. The entire tank inductance coil is used as the primary coil.

The most desirable frequency to be employed will, of course, vary somewhat depending upon the particular operation contemplated, it being necessary to consider the diameter of the tube, the permeability and the electrical resistance of the metal of which the tube is formed, the welding temperature of the particular metal, the specific heat of the metal and the rate at which the welding operation is to be performed. In ordinary operations, I have found 9600 cycles to be a practical effective minimum, although in exceptional cases when welding very large diameter thick-walled tubing a frequency as low as 3000 cycles may on occasion be employed. While the heat input may, of course, be varied by adjusting the initial generator voltage (i. e. that of the power source), the operation will be inefficient if the frequency employed is grossly different from that determined to be desirable as a result of the above considerations.

The concentrator 53 operates both as the secondary of a transformer (inasmuch as it lies within coil 7) and also as an inductor relative to the tube blank B. The portion 67 of inner wall 55 of such concentrator 53 which extends parallel to and closely adjacent the tube blank may be substantially shorter than the axial extent of coil 7, thereby concentrating the current in this region, as well as protruding from the coil toward the squeeze roll unit, so that the region in which the induced current is concentrated may lie closely adjacent such squeeze rolls while at the same time facilitating the mechanical installation of the inductor unit in that the leads to coil 7 may extend from the latter without interference with the squeeze rolls. The concentrator may desirably be silver plated similarly to coil 7 when very high frequencies are to be employed. The flux induced by outer coil 7 links the outer portion of concentrator shell 54, inducing a voltage around the exterior of such shell and across the open gap between partitions 57 and 58; the current thus produced flows for any half cycle inwardly along either partition 57 or 58 and around the small diameter inner cylindrical shell portion 67, returning to the outer periphery of shell 54 along the other of such partition 57 and 58. Since high frequency currents tend to circulate along the shortest path most of the current produced in the full length of outer shell 54 is concentrated in the short inner portion 67, thereby setting up the desired intense field, through which the tube blank passes, in the proper location, i. e., offset from coil 7 toward the squeeze rolls. In view of such portion 67 being thus axially offset, substantially beyond the confines of coil 7, very little interference results between their respective fields of opposite polarity, leaving the field of portion 67 fully effective to perform its work.

Figures 10, 11, 12:
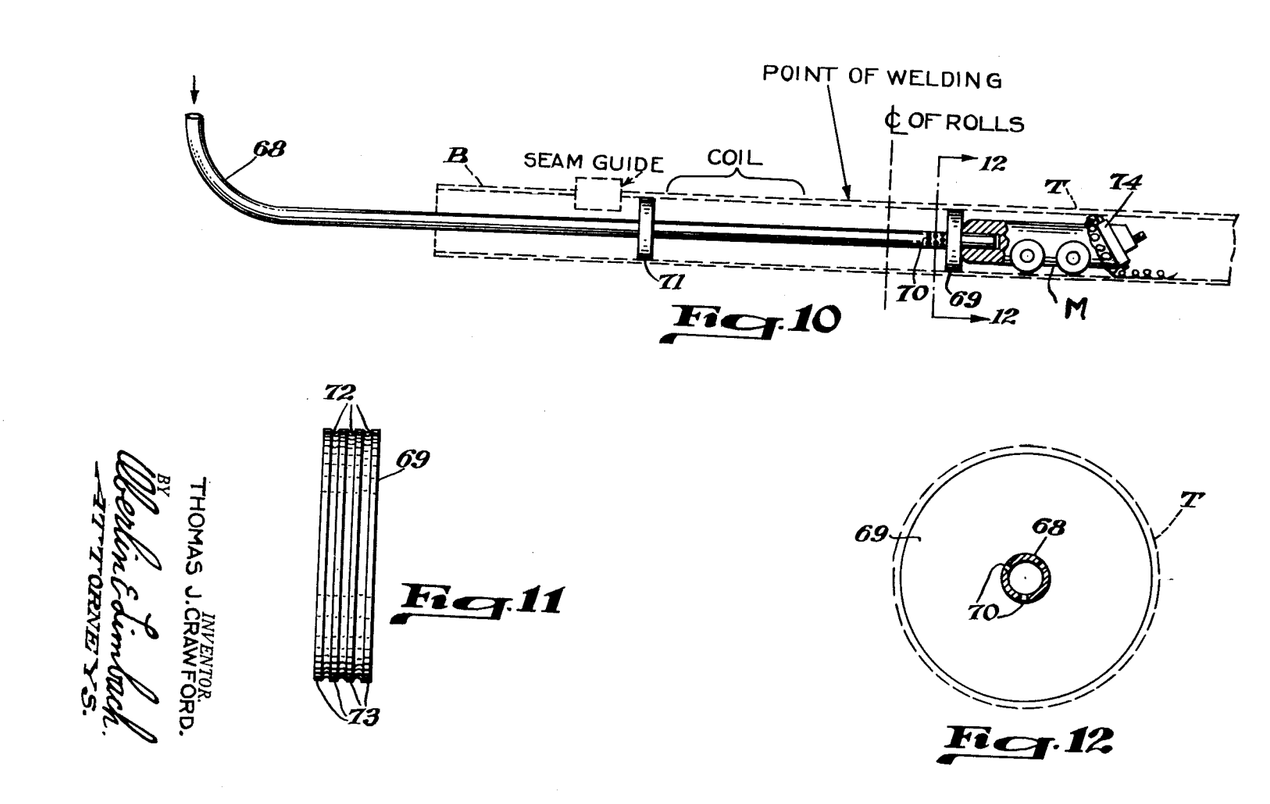
Fig. 10 illustrates means for introducing inert or reducing gases and/or fluxing agents adjacent the point of welding.
Fig. 11 is a side elevational view of one of the baffles comprising an element of such means.
Fig. 12 is a vertical sectional view taken on the line 12—12 on Fig. 10.

When welding certain metals and alloys such as, for example, "Everdur" (a silicon bronze alloy), there may be a tendency to form oxide inclusions in the weld, and it is important either to prevent the formation of such oxide or to flux the same away during the welding operation. I accordingly also provide means for the introduction of an inert gas such as helium to the welding region to prevent oxide formation or for introducing natural gases or the like having entrained therein a solution of methyl borate in acetone, this latter serving as an excellent flux particularly effective when welding steel, copper alloy tubing and the like. The device comprises a length of copper tube 68 adapted to enter the preformed tube blank B immediately following the last roll of forming mill 4 which bears against the inner surface of such blank. It is important that at least the portion of tube 68 passing through the inductor field be of non-magnetic material and of quite small diameter so as not to rob the field. Copper tubing 68 then extends generally axially of the tube blank to a point somewhat beyond the squeeze rolls of squeeze roll unit 8, this end of tubing 68 being plugged. A Micarta or similar wear and heat resistant disc 69 is mounted on tubing 68 adjacent such latter end to serve as a baffle, being of only slightly less diameter than the inner diameter of the welded tube T. A plurality of orifices 70 are provided in tubing 68 adjacent such baffle so that a gas may be introduced therethrough to the interior of welded tube T somewhat beyond the point of welding of the same. Such gas will then escape therefrom through the seam between the opposed seam edges 25 and 26 in the region where such seam edges are heated through the agency of inductance coil 7. Another circular baffle 71, likewise of insulating material, will preferably be mounted on tubing 68 at a point intermediate the seam guide 21 and coil 7 thus to direct the escaping gas upwardly through the open seam. As shown in Fig. 11, the baffles 69 and 71 will preferably be provided with peripheral grooves such as 72 and ridges 73 to obtain a better seal in well-known manner. It thus becomes a simple matter to introduce a gas which may be inert, such as helium, of a reducing nature such as hydrogen or natural gas, or have entrained an organic flux in vapor form.

It will, of course, be understood that the particular gaseous medium utilized may vary depending upon the particular welding operation, and in many instances the entire device for its introduction may be dispensed with. When such device is employed, however, it may also constitute a convenient supporting means for an inner burr or bead trimming tool 74 mounted on a conventional carriage or mandrel M secured to the end of tube 68 and adapted to remove any bead which may be formed on the inside of the tubing along the welded seam. The use of internal bead trimming tools is, of course, broadly old in the art. Devices for entraining a fluxing material in an appropriate gaseous vehicle and known as "gas fluxers" are well known in the art and commercially available, being employed at the present time to assist brazing and torch welding operations.

For a fuller appreciation of the principles of my invention and the theory underlying the same, reference may now be had to Fig. 8 of the drawing as explained below. The open seam of the preformed tube blank B is engaged by the insulated seam guide 21, 22, 23, both to space edges 25 and 26 slightly farther apart and also properly to register the blank circumferentially relative to the squeeze rolls. Such seam guide is relatively thick as compared to similar guides proposed in prior art attempts and is also relatively close to the squeeze roll unit (although the inductance coil is of course interposed therebetween) so that the opposed seam edges are too widely spaced apart to permit any appreciable arcing thereacross under conditions of use and approach each other at an angle which is not as acute as in prior art attempts. Consequently, the current produced by the voltage induced circumferentially of tube blank B within the confines of the inductor must of necessity travel longitudinally of the blank to pass across the seam at or beyond the point of welding and beyond the confines of such inductor (see Fig. 8). The fact that the seam edges approach each other at a relatively large angle not only discourages arcing but also renders it a simple matter to maintain such point of juncture uniform in relation to the inductor and squeeze roll units. Where the seam edges have in the past been caused to approach each other at a very acuate angle, there has been a decided tendency for the point of welding juncture to shift back and forth with the result that sometimes holes are burned in the welded seam and at other times only intermittent "stitching" is accomplished.

As above indicated, the blank B passes from the seam guide unit (when such is employed) immediately to the inductor unit, traveling axially through coil 7 and the concentrator 53 if the latter be employed. Such concentrator will ordinarily only be utilized when welding the smaller diameter tubes as, for example, one-half inch O. D., or less. Portion 67 of the concentrator will lie closely adjacent but out of contact with the tube blank passing therethrough. When no such concentrator is employed the coil 7, ordinarily one or more turns of water-cooled ¼ inch copper tubing, will similarly closely encircle the tube blank B. The number of turns of the coil will be selected to obtain the maximum power output from the particular oscillator employed. The path followed by the high frequency current produced in the tube blank is diagrammatically indicated in Fig. 8, the generally circumferential portion thereof lying substantially within the confines of coil 7 (or of concentrator neck 67, when employed).

In selecting the frequency of the current to be passed through such coil, weight will be given to the following considerations. The induced voltage will be proportional to the frequency and to the cross-sectional area defined by the tube and this latter is proportional to the square of the diameter whereas the resistance of the tube is directly proportional to the diameter. Consequently, the frequency which need be employed will decrease with increase in the tube diameter.

In order to obtain the necessary heat input ($I^2R$), it will obviously be necessary to employ a higher frequency the higher the resistance of the particular metal being welded.

Likewise, when welding a metal having a high welding temperature, a relatively high frequency must be employed to raise the seam edges to such temperature.

Similarly, the greater the specific heat of the metal being welded, the higher the frequency which must be employed. It will, of course, be appreciated that the foregoing explanation assumes that other factors are maintained constant since the rate of travel of the tube blank may, for example, be adjusted to compensate for some of the variables referred to. From a practical operating point of view, however, such speed of travel must be maintained at a mechanically and commercially feasible rate.

The frequency employed in practice may ordinarily range from about 9,600 to 400,000 cycles, and may exceed 500,000 cycles for very small diameter tubes, 10,000,000 cycles theoretically being feasible. In the case of very large diameter tubes the frequency may be as low as 2800 cycles, although this will probably be a rare occurrence.

The voltage appearing across the seam edges ahead of the point of welding will be insufficient to cause any appreciable arcing between the seam edges. However, just as such edges are brought together at the point of welding sputtering may take place which has the effect of cleaning the opposed edge surfaces. The voltage selected will, of course, depend on the material to be welded and speed of operation. For reasons explained below, under usual operating conditions, if the voltage is raised to a too high level the result will be to burn out the metal.

Despite the proximity of the inductor unit to the squeeze rolls the latter will be relatively little affected thereby, being substantially outside the field of such inductor. It is nevertheless generally desirable to employ non-magnetic materials for the rolls, and where a roll is used directly over the welded seam it should preferably be of insulating and refractory material such as bonded sapphire or vitreous alumina. Sapphire rolls are suitable but rather expensive. Due to the fact that my new process acts to concentrate the welding heat at the point of welding to a very high degree it is not generally necessary to exert such heavy pressures on the squeeze rolls as in the past and this facilitates employment of such rolls. Furthermore, thin-walled aluminum tubing and the like may be welded without danger of crushing the same.

Figure 8:
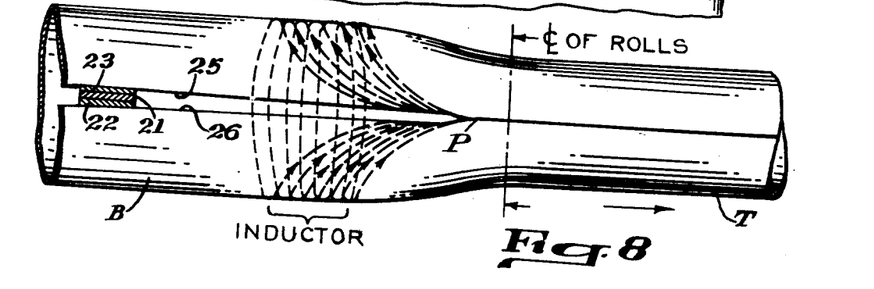
Fig. 8 is a diagrammatic top plan view of a portion of the continuously traveling tube blank, explanatory of the manner in which the welding operation is performed.

As indicated in Fig. 8, the current induced in the tube blank by the inductance coil flows circumferentially of the blank but being unable to jump the open seam it crosses over at the point of juncture of the seam edges. The squeeze rolls are adjusted so that such point of juncture is slightly in advance of the center line of the squeeze rolls and consequently the interfused edges of the seam are thereupon slightly urged together in a subsequent forging operation by action of the rolls. This forging operation affords improved grain structure in the weld and ensures a perfect joint with no pin-holes.

The point of bringing together the opposed seam edges relative to the inductor is critical to the success of my invention. Such point must be spaced axially from the confines of the effective current-inducing portion of such inductor so that the current induced in the tube blank will be caused to flow lengthwise of such blank to pass around the open end of the seam. The "skin effect" and "proximity effect" of such induced current consequently achieve my object of concentrating the welding current (and the heat developed thereby) at an extremely localized point (the point of juncture of the seam edges) without greatly heating the body of the tube. Thus, if the seam edges were brought into contact before passage through the inductor there would be slight resistance heating at such edges but no great concentration of current density at a single point. If the seam edges were brought together within the confines of the coil, the heating effect would be somewhat enhanced but there would be a very large power loss and the process would not be commercially feasible. By bringing the opposed seam edges together sufficiently beyond the inductor the induced current is caused to concentrate at such edges and particularly at the point of contact of the latter. The most efficient use is accordingly made of the power applied without unduly heating the body of the tube either circumferentially or longitudinally beyond the exact point of welding. Since high frequency currents do not penetrate much below the surface of the metal conductor and tend to follow the path of least impedance (the vector sum of resistance and reactance), it will readily be seen that the current induced in the tube blank will pass circumferentially of the inner end outer surfaces of the latter and then along the opposed surfaces of the seam edges to the point of welding contact W of such edges (Fig. 8). This "skin effect" is much enhanced in the region of the seam edges by the "proximity effect" resulting from the opposite directions of flow of the induced current along the opposed seam edges. At the point of seam edge juncture these two effects result in an extremely high current density being achieved.

Thus it will be seen that the opposed seam edges are not highly pre-heated (since there is no arcing) and it is only as such edges closely approach the point of juncture that the rapidly increasing current density is effective highly to heat such edges. Just as the edges are about to touch each other the low voltage employed may be sufficient to cause sputtering and this has the advantage of cleaning the juxtaposed surfaces as in a flash weld, particularly advantageous in the case of aluminum. The seam edges are not raised to welding temperature (i. e. the temperature at which they will normally interfuse as contrasted to forging or upsetting temperature) until just before such point of juncture.

The increase in current density at such point of juncture is so abrupt that a substantial increase in voltage (other welding conditions remaining normal) will not cause arcing to develop back along the open seam but instead the seam will burn out where the edges are thus brought together. My process is primarily one of resistance welding where the welding temperature which may be achieved is sufficiently high to ensure complete interfusion of the juxtaposed edges but the region where such temperature is developed is so limited that the remainder of the tube is only relatively slightly heated and energy is conserved. Of course, there are various attendant advantages such as the fact that the squeeze rolls do not become overheated, such rolls are substantially outside the field of the inductor, only a relatively low degree of pressure need be exerted thereby to achieve a perfect weld and subsequent forging of the same, a very high rate of tube blank travel (and therefore production of finished tubing) is feasible, and a considerable variation in such rate can be tolerated without corresponding regulation of the power input, squeeze roll pressures, etc. This last is of great importance inasmuch as it permits supervision of the process by a relatively unskilled operator and ensures a uniform high quality product.

At the point where the seam edges are brought together there may be a slight sputtering due to the break-down of an oxide film, such sputtering being more pronounced in the case of aluminum than steel since the insulating effect of aluminum oxide is greater. Similarly, the sputtering is more pronounced in the case of silicon bronze than with copper. This sputtering helps to clean the opposed seam edges so that preliminary cleaning operations are unnecessary. In the case of materials such as steel having a wide plastic range, a forged weld may be obtained even when insufficient heat is supplied to produce a molten state at the point of seam edge juncture. Ordinarily, however, I prefer to generate sufficient heat to interfuse the seam edges at this point.

When welding very heavy walled tubing and employing a relatively low frequency such as 3000 cycles, it may be desirable to provide a powdered and sintered or bonded iron core within the tube blank in the region of the inductor to enhance the efficiency of the latter. Such core will be of well-known type and may, for example, be mounted on and carried by tube 68. There will ordinarily be no necessity to employ a core, however.

It is generally preferred that the frequency of the current be sufficiently high that effective current penetration will be no more than about 10 one-thousandths of an inch below the surface of the work. In the case of very large diameter tubes, however, where somewhat lower frequency ranges may desirably be utilized, this degree of penetration may be considerably exceeded.

It will now have been seen that I have provided a method of tube welding wherein a continuous length of metal strip is formed to general tubular conformation with opposed spaced edges defining a longitudinally extending open seam, a high-frequency alternating magnetic field is induced within and around a relatively short longitudinally extending portion of such preformed tube blank, such blank being continuously advanced through the effective region of such field, such opposed seam edges are brought together at a point spaced a sufficient distance from such region in the direction of travel of such blank that the induced voltage across the spaced seam edges will be substantially lower immediately prior to such point than in such effective region of such field, thereby causing the induced current to flow along the opposed seam edges as the combined result of the skin effect and proximity effect to such point, where an extremely high current density is obtained, such high current density being effective to heat the seam edges to fusion temperature to interfuse the same, and thereafter such interfused edges are forced further together in a forging or upsetting operation.

In practising my invention, the point of welding will ordinarily be a distance beyond the region of high flux density equal to from about one to about two diameters of the tube being produced. In the forms of inductor specifically disclosed above such region of high flux density may be considered as terminating quite abruptly closely beyond the extremity of the inductor nearest such point of welding. By "point of welding" or "point of juncture" as used herein I mean that point at which the juxtaposed seam edges are initially interfused, this ordinarily being somewhat in advance of the center line of the squeeze rolls. As a practical matter, the immediate subsequent forging step is both mechanically convenient and advantageous but, of course, may be largely dispensed with if the squeeze rolls are carefully adjusted and the tube blank perfectly preformed so that the seam edges will be brought together into welding engagement very close to the center line of the rolls.

My process and apparatus are useful not only in the welding of carbon steel tubing, but also in welding tubing of stainless steel, silicon bronze (Everdur), copper, brass, aluminum, and various non-ferrous alloys.

The production of tubing, and particularly thin-walled tubing, in accordance with my invention is, of course, much less expensive than conventional tube drawing operations. The metal strip of desired gauge is very rapidly formed into a tubular blank (of round, square, or other cross-section) and the efficiency of my method and apparatus permit a high rate of production of the welded tubing. By way of illustration, and not limitation, the following examples of actual production runs may be given:

(a) Low carbon cold rolled steel strip was formed and welded at the rate of 66 feet per minute to produce one inch O. D. tubing having a wall thickness of .012 inch. To the best of my knowledge no such thin-walled tubing has ever previously been produced by electric welding methods of any type. The input to the inductor was approximately 32.8 kw., such inductor comprising a coil of four turns of copper tubing with $\frac{3}{32}$ of an inch spacing between the turns. The inner diameter of the coil was $1\frac{5}{16}$ inches.

(b) 3S, half hard, aluminum alloy strip was formed and welded at a rate of 82 feet per minute to produce one inch O. D. tubing having a wall thickness of .051 inch. To the best of my knowledge, this is many times the speed at which it has previously been possible to produce welded aluminum tubing and, in fact, practically all aluminum tubing previously commercially available has been of the extruded type.

It should be appreciated that by employment of my new method it is not only possible to utilize readily available metal strip materials but that also the highly desirable properties of such materials are preserved. Thus, cold-working of metal strip ordinarily increases the yield strength, ultimate strength, and hardness of the same but ordinary welding procedures tend to produce a substantial annealed area or region to each side of the weld proper, such region generally being termed the "weld zone." Furthermore, the weld itself is generally relatively wide, leaving a line or section of cast metal having properties different from the balance of the weld zone and also the unaffected remaining portion of the article. In contrast, I am enabled to produce welded tubing, the characteristics of which remain substantially uniform about its entire circumference.

When employing my method of welding a very narrow molten or plastic region is produced at the weld which may then be further reduced by the forging operation of the squeeze rolls, such operation serving to squeeze much of the affected metal out of the seam in the form of a bead. Consequently, the weld proper, while it may be of the cast-weld type, is then extremely narrow. The usual later sizing operation (reducing the tube diameter slightly) affords preferential cold working of this narrow weld, since the cast weld is of softer metal than the body of the tube, and the degree of such cold working of the weld is of course accentuated by the extreme narrowness of the latter. Thus, only a small reduction in tube diameter nevertheless affords quite considerable cold working of the weld. The tubing produced in accordance with my invention therefore not only retains the desirable qualities of the strip stock from which it is formed but also is exceptionally uniform with regard to such qualities even in the weld zone.

I have found that when welding aluminum alloy tubing by my new process it is feasible to produce a welded seam in which the width of the cast weld region is equal to only about 20% of the tube wall thickness even prior to my subsequent sizing operation. In prior art methods of welding aluminum the cast weld portion has always been at least as wide as the material was thick, and generally considerably wider.

I have thus been enabled to produce resistance-welded tubing of carbon steel and stainless steel having a wall thickness of as little as .012 inches and even less, and likewise to produce such tubing of aluminum and other non-ferrous metals and their alloys having a wall thickness much less than ever before possible, with a cast-weld longitudinally extending seam the width of which is no greater than approximately 20% of the wall thickness. Such tubing may readily be corrugated, for example, by well-known procedures without damage thereto at the welded seam or weld zone.

The fact that extremely heavy pressure is not required to be exerted on the blank by the squeeze rolls facilitates the production of such thin-walled tubing and other pressure means such as a bell may be employed instead of such rolls although the rolls are preferred.

Other modes of applying the principle of the invention may be employed, change being made as regards the details described, provided the features stated in any of the following claims or the equivalent of such be employed.

I therefore particularly point out and distinctly claim as my invention:

1. The method of producing welded tubing which comprises forming a generally tubular blank having an open longitudinally extending seam, generating a high-frequency alternating magnetic field, passing such tubular blank through such field with such field being substantially uniform circumferentially of such blank, and bringing the opposed seam edges together at a point beyond the effective limits of such field after passage therethrough, such point being spaced a sufficient distance beyond such limits in the direction of travel of such blank that the induced voltage across the spaced seam edges will be substantially lower immediately prior to such point than within such region, thereby causing a high-frequency induced current to flow generally circumferentially of such blank within such field and along the opposed seam edges to such point of juncture thereof, the combined result of the skin effect and proximity effect being thus to concentrate such current along such seam edges to an increasing degree toward such point of juncture where an extremely high current density is obtained, such high current density being effective to heat the seam edges to fusion temperature and to interfuse the same.

2. The method of producing welded tubing which comprises forming a generally tubular blank having an open longitudinally extending seam, generating a high-frequency alternating magnetic field, passing such tubular blank centrally through such field with such field being substantially uniform circumferentially of such blank, and bringing the opposed seam edges together at a point beyond the effective limits of such field after passage therethrough, the voltage induced in such blank being insufficient to cause arcing between the opposed seam edges within the effective limits of such field and the current induced in such blank flowing circumferentially thereof within such field and highly concentrated at the opposed seam edges at such point of juncture being sufficient to heat such edges to welding temperature at such point.

3. The method of producing welded tubing which comprises forming a generally tubular blank having an open longitudinally extending seam, generating a high-frequency alternating magnetic field, passing such tubular blank through such field, and bringing the opposed seam edges together at a point beyond the effective limits of such field after passage therethrough, the voltage induced in such blank being insufficient to cause arcing between the opposed seam edges within the effective limits of such field and the current induced in such blank flowing circumferentially thereof within such field and highly concentrated at the opposed seam edges at such point of juncture being sufficient to heat only the opposed extreme edge portions of such seam to welding temperature at such point.

4. The method of producing welded tubing which comprises forming a generally tubular metal blank having an open longitudinally extending seam, advancing such blank axially, generating a high frequency alternating magnetic field around such advancing blank in a local region and symmetrical of the longitudinal axis of such blank, bringing the seam edges of such blank together at a point spaced axially beyond the region of such field in the direction of travel of such blank, such magnetic field inducing a voltage in such blank effective to generate a high frequency current in such blank within such region with such current flowing along the seam edges through such point of meeting of such edges.

5. The method of producing welded tubing which comprises forming a generally tubular blank having an open longitudinally extending seam, generating a high-frequency alternating magnetic field of at least 9600 cycles, passing such tubular blank through such field, and bringing the opposed seam edges together at a point beyond the effective limits of such field after passage therethrough, such point being spaced a sufficient distance beyond such limits in the direction of travel of such blank that the induced voltage across the spaced seam edges will be substantially lower immediately prior to such point than within such region, thereby causing a high-frequency induced current to flow generally circumferentially of such blank within such field and along the opposed seam edges to such point of juncture thereof, the combined result of the skin effect and proximity effect being thus to concentrate such current along such seam edges to an increasing degree toward such point of juncture where an extremely high current density is obtained, such high current density being effective to heat the seam edges to fusion temperature and to interfuse the same.

6. The method of producing welded tubing which comprises forming a generally tubular blank having an open longitudinally extending seam, generating a high-frequency alternating magnetic field of from about 9600 to 500,000 cycles, passing such tubular blank through such field, and bringing the opposed seam edges together at a point beyond the effective limits of such field after passage therethrough, such point being spaced a sufficient distance beyond such limits in the direction of travel of such blank that the induced voltage across the spaced seam edges will be substantially lower immediately prior to such point than within such region, such induced voltage being insufficient to cause any substantial arcing between the opposed seam edges but effective to cause a high-frequency induced current to flow generally circumferentially of such blank within such field and along the opposed seam edges to such point of juncture thereof, the combined result of the skin effect and proximity effect being thus to concentrate such current along such seam edges to an increasing degree toward such point of juncture where an extremely high current density is obtained, such high current density being effective to heat the seam edges to fusion temperature and to interfuse the same.

7. The method of producing welded tubing which comprises progressively bringing together the opposed spaced edges of a longitudinally extending seam in a tubular metal blank, and inducing a high-frequency alternating electric current flowing generally circumferentially of such blank in a region in advance of the point of juncture of such seam edges and longitudinally of such blank to such point, such point of juncture lying beyond the effective limit of the current-inducing field.

8. The method of producing welded tubing which comprises progressively continuously bringing together the opposed spaced edges of a longitudinally extending seam in a tubular metal blank, and heating such opposed seam edges to welding temperature locally in the region of the point of juncture thereof by causing a concentrated high-frequency electric current to flow substantially entirely along the opposed faces of such opposed spaced edges to the point of juncture of such edges for a substantial distance immediately in advance of such point and causing such current to flow across such seam edges at such point.

9. The method of producing welded tubing which comprises progressively bringing together the opposed spaced edges of a longitudinally extending seam in a tubular metal blank, and heating such opposed seam to welding temperature locally in the region of the point of juncture thereof by inducing a high-frequency alternating electric current to flow along such opposed spaced edges to the point of juncture of such edges and across such edges at such point, the concentration of such current at such edges being insufficient to raise such edges to welding temperature except at such point, such point of juncture of such edges lying beyond the effective limits of the current-inducing field.

10. In apparatus for the continuous production of welded tubing from metal strip, including a mill for forming such strip into a tubular blank having an open longitudinal seam, a seam blank having an open in such seam, heating means guide engageable in such seam, heating means operative to heat such seam edges, and squeeze rolls operative to force such edges together; a seam guide comprising a support, a pair of flat metal plates carried by said support and insulated therefrom and from each other adapted to engage such respective seam edges to position and slightly spread the same, a high-frequency induction coil closely following said seam guide and adapted to encircle such tubular blank, and non-magnetic squeeze rolls closely following said coil adapted to force such seam edges together at a point beyond the effective limits of the field of said inductance coil.

11. In apparatus for the production of welded tubing from a tubular blank having an open longitudinal seam, a high frequency inductor through the field of which such entire blank is adapted to pass, said inductor generating a high-frequency alternating magnetic field of at least 2800 cycles, and means adapted to force together the spaced opposed edges of such seam at a point beyond the effective limit of such field but closely adjacent the same, said latter means comprising a squeeze roll unit comprising two stands spaced apart along the line of travel of the tube beyond said inductor, a plurality of arms pivotally mounted on said stand further from said inductor and extending past said stand nearer said inductor, squeeze rolls mounted on the ends of said arms adapted to engage such blank therebetween adjacent said inductor, and means on said stand nearer said inductor adapted adjustably to force said arms radially inwardly toward such blank.

12. In apparatus for the production of welded tubing from a tubular blank having an open longitudinally extending seam, such apparatus including a high frequency inductor coil through which such blank is adapted to pass; a squeeze roll unit adjacent such inductor coil comprising a base, a stand removably mounted thereon and having an opening for the passage of tubing therethrough, three arms pivotally secured to said stand for swinging movement radially inwardly of such opening and extending in the direction of such coil, said arms being arranged and disposed substantially equidistantly about the periphery of such opening with one said arm being pivotally mounted below such opening for upward swinging movement, a second stand removably mounted on said base and spaced from said first stand in the direction said arms extend, squeeze rolls mounted on the ends of said arms beyond said second stand and closely adjacent such coil, and means on said second stand adapted to bear on said arms to force them radially inwardly toward such tube, said stands being also formed for mounting in inverted position on said base so that one of said squeeze rolls may be positioned directly above or below such tube as desired, depending on whether or not it is desired that such roll overlie an upper longitudinally extending seam of such tube, whereby said stands and arms may be located substantially entirely beyond the field of such inductor despite close proximity of said rolls to such inductor.

13. In combination, a high frequency inductor through the field of which a tubular metal blank having a longitudinally open seam is adapted to be passed, and a squeeze roll unit comprising a base spaced from said inductor in the general direction of the line of travel of such blank, and roll-supporting arms extending therefrom toward said inductor in a direction generally parallel to such line of travel, said unit including means adapted to force said arms radially inwardly toward said blank with such rolls engaging the latter closely adjacent said inductor.

14. In combination, a high frequency inductor coil through which a tubular metal blank having a longitudinally open seam is adapted to be passed, and a plurality of non-magnetic squeeze rolls arranged and disposed to engage such blank closely adjacent said inductor, and mounting means for each of said rolls supported a substantial distance generally axially beyond said inductor and extending theretoward to mount said rolls with minimum interference with said inductor.

15. In apparatus for the production of welded tubing from a tubular blank having an open longitudinal seam, a high frequency inductor through the field of which such blank is adapted to pass, a seam guide closely preceding said inductor on the line of travel of such blank, pressure means adapted to force together the spaced opposed edges of such seam at a point beyond the effective limit of such field but closely adjacent the same, and means for introducing a gaseous medium within the work-piece for escape therefrom in the region of welding comprising a tube of non-magnetic material arranged and disposed to enter such blank through such open seam thereof before the latter reaches said seam guide and to extend generally axially within such blank to a point beyond said pressure means, an orifice in said tube adjacent the end thereof, a baffle carried by said tube beyond said orifice adapted to position and support said tube within the work and to prevent flow of such gaseous medium therebeyond, another baffle carried by said tube at a point between said seam guide and said inductor, and a flash trimming tool secured to the end of said tube beyond said first-named baffle adapted to trim internal weld flash from the work.

16. The method of producing welded tubing which comprises forming a generally tubular blank having an open longitudinally extending seam, generating a high-frequency alternating magnetic field, passing such tubular blank through such field, and bringing the opposed seam edges together at a point at least one tube diameter beyond the effective limits of such field after passage therethrough, the voltage induced in such blank being insufficient to cause arcing between the opposed seam edges within the effective limits of such field and the current induced in such blank flowing circumferentially thereof within such field and highly concentrated at the opposed seam edges at such point of juncture being sufficient to heat only the opposed extreme edge portions of such seam to welding temperature at such point.

17. The method of producing welded tubing which comprises progressively bringing together the opposed spaced edges of a longitudinally extending seam in a tubular metal blank, inducing a high frequency alternating electric current flowing generally circumferentially of such blank in a region in advance of the point of juncture of such seam edges and longitudinally of such blank to such point, such point of juncture lying beyond the effective limit of the current inducing field, to obtain an abrupt local increase in current density effective to raise such seam edges to welding temperature in the region of such point only, to interfuse the same, and immediately thereafter forcing such interfused edges further together to forge the weld and squeeze out a portion of the molten cast weld metal to leave a cast weld seam having a width less than 20% of the tube wall thickness.

18. The method of producing welded tubing which comprises progressively bringing together the opposed spaced edges of a longitudinally extending seam in a tubular metal blank, inducing a high frequency alternating electric current flowing generally circumferentially of such blank in a region in advance of the point of juncture of such seam edges and longitudinally of such blank to such point, such point of juncture lying beyond the effective limit of the current inducing field, to obtain an abrupt local increase in current density effective to raise such seam edges to welding temperature in the region of such point only, to interfuse the same, immediately thereafter forcing such interfused edges further together to forge the weld and squeeze out a portion of the molten cast weld metal to leave a cast weld seam having a width less than 20% of the tube wall thickness, and subsequently cold working the resultant welded tubing by slightly reducing the same.

19. The method of producing welded tubing which comprises progressively bringing together the opposed spaced edges of a longitudinally extending seam in a tubular metal blank, inducing a high frequency alternating electric current flowing generally circumferentially of such blank in a region in advance of the point of juncture of such seam edges and longitudinally of such blank to such point, such point of juncture lying beyond the effective limit of the current inducing field, concentrating such current at such point as a result of the "skin effect" to obtain an abrupt local increase in current density effective to raise such seam edges to welding temperature in the region of such point only, to interfuse the same, and subsequently cold working the resultant welded tubing by slightly reducing the same, such cold working being disproportionately large in the weld zone.

References Cited in the file of this patent

UNITED STATES PATENTS

| Number | Name | Date |
| --- | --- | --- |
| 1,435,306 | Johnston | Nov. 14, 1922 |
| 2,020,276 | Crawford | Nov. 5, 1935 |
| 2,086,305 | Sessions | July 6, 1937 |
| 2,094,920 | Inslee | Oct. 5, 1937 |
| 2,205,424 | Leonard, Jr. | June 25, 1940 |
| 2,433,296 | Schaefer | Dec. 23, 1947 |
| 2,496,188 | Wiese | Jan. 31, 1950 |
| 2,509,713 | Achard | May 30, 1950 |
| 2,582,963 | Cachat | Jan. 22, 1952 |

FOREIGN PATENTS

| Number | Country | Date |
| --- | --- | --- |
| 377,655 | Great Britain | (Open to public inspection before Dec. 31, 1932.) |
| 616,117 | Great Britain | Jan. 17, 1949 |